United States Patent
Morino et al.

(10) Patent No.: US 7,774,621 B2
(45) Date of Patent: Aug. 10, 2010

(54) CONTROLLER TO MOVE CONTENTS AND CONTROL METHOD THEREOF

(75) Inventors: Harumi Morino, Yokohama (JP); Hideki Kamimaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1248 days.

(21) Appl. No.: 11/270,840

(22) Filed: Nov. 8, 2005

(65) Prior Publication Data
US 2006/0143478 A1 Jun. 29, 2006

(30) Foreign Application Priority Data
Dec. 27, 2004 (JP) ............................. 2004-375659

(51) Int. Cl.
*G06F 11/30* (2006.01)
(52) U.S. Cl. ............................................. 713/193
(58) Field of Classification Search ................. 713/193
See application file for complete search history.

(56) References Cited

U.S. PATENT DOCUMENTS

| | | | | | |
|---|---|---|---|---|---|
| 4,563,702 | A | * | 1/1986 | Heller et al. ................ | 380/215 |
| 5,303,302 | A | * | 4/1994 | Burrows ...................... | 713/161 |
| 2002/0141590 | A1 | * | 10/2002 | Montgomery ............... | 380/277 |
| 2002/0164024 | A1 | * | 11/2002 | Arakawa et al. ............ | 380/210 |
| 2003/0217279 | A1 | * | 11/2003 | Fuchigami et al. .......... | 713/189 |
| 2003/0233379 | A1 | * | 12/2003 | Cohen et al. ................ | 707/200 |
| 2004/0210948 | A1 | * | 10/2004 | Jin et al. ..................... | 725/145 |
| 2006/0020989 | A1 | * | 1/2006 | Brun ........................... | 725/101 |
| 2006/0117363 | A1 | * | 6/2006 | Lee et al. .................... | 725/106 |
| 2006/0143479 | A1 | * | 6/2006 | Morita ........................ | 713/193 |
| 2006/0179464 | A1 | * | 8/2006 | Park et al. .................... | 725/95 |
| 2007/0300017 | A1 | * | 12/2007 | Snijder et al. .............. | 711/148 |

FOREIGN PATENT DOCUMENTS
JP 2003-101529 4/2003

* cited by examiner

*Primary Examiner*—Kambiz Zand
*Assistant Examiner*—Teshome Hailu
(74) *Attorney, Agent, or Firm*—Townsend and Townsend and Crew LLP

(57) ABSTRACT

Even when a content is split due to a failure occurrence in the course of moving the content, the contents having been split are combined and reconstructed. A controller to move contents that moves the content stored in a first storage unit to a second storage unit, includes means for rendering the content to be playback impracticable, the content remaining in the first storage unit and corresponding to the content having been moved to the second storage unit, storing means for storing information regarding content movement, including information which specifies the content in the first storage unit and the second storage unit, selecting means for selecting one of continuously moving or reconstructing the content in the first storage unit when a failure occurs, means for verifying the second storage unit as a target and the content therein, by use of the information which specifies the second storage unit as a target and the content, and means for determining a range as to which the content movement is continued or the content is reconstructed, so as to continue one of the content movement and the content reconstruction.

20 Claims, 10 Drawing Sheets

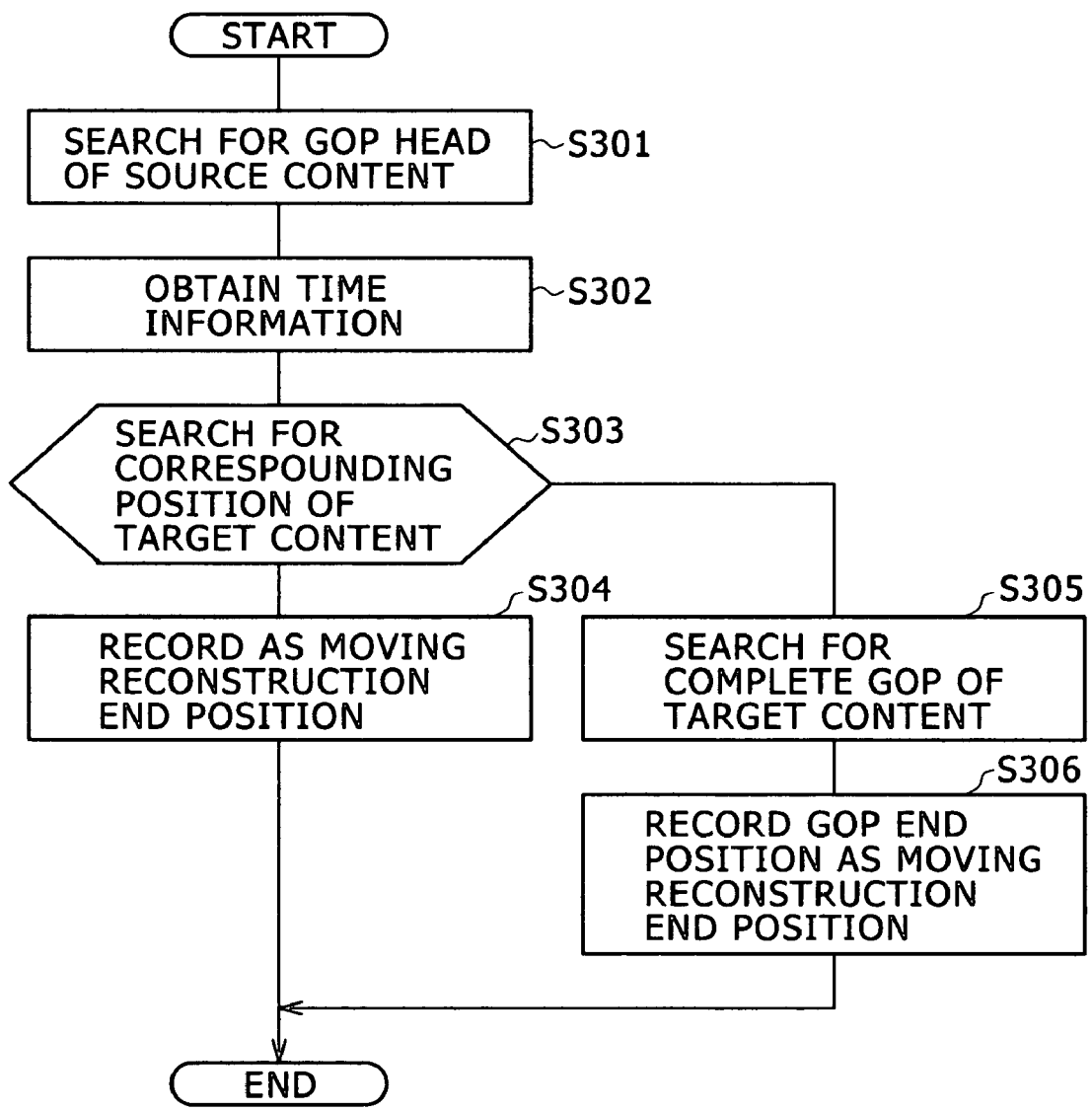

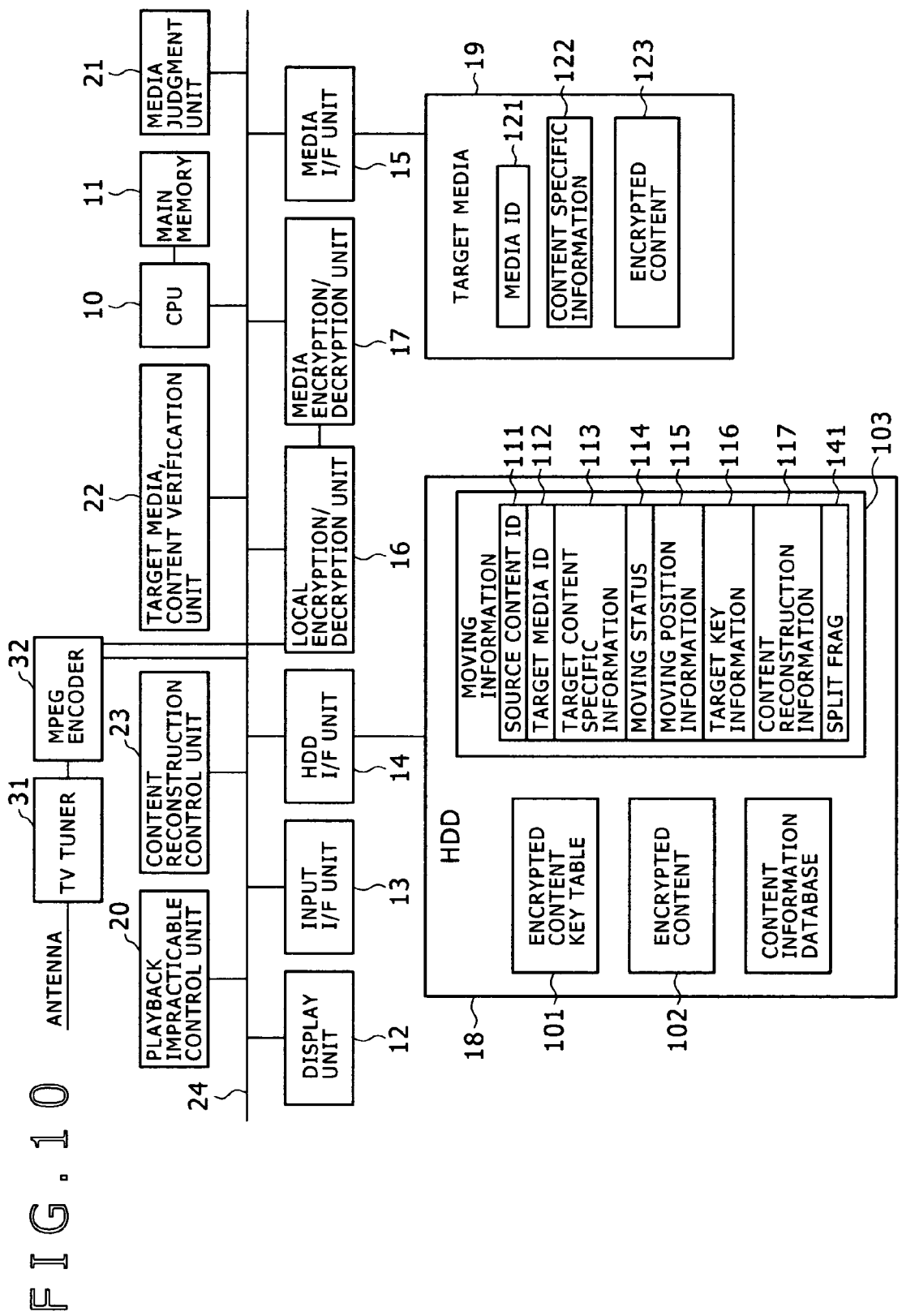

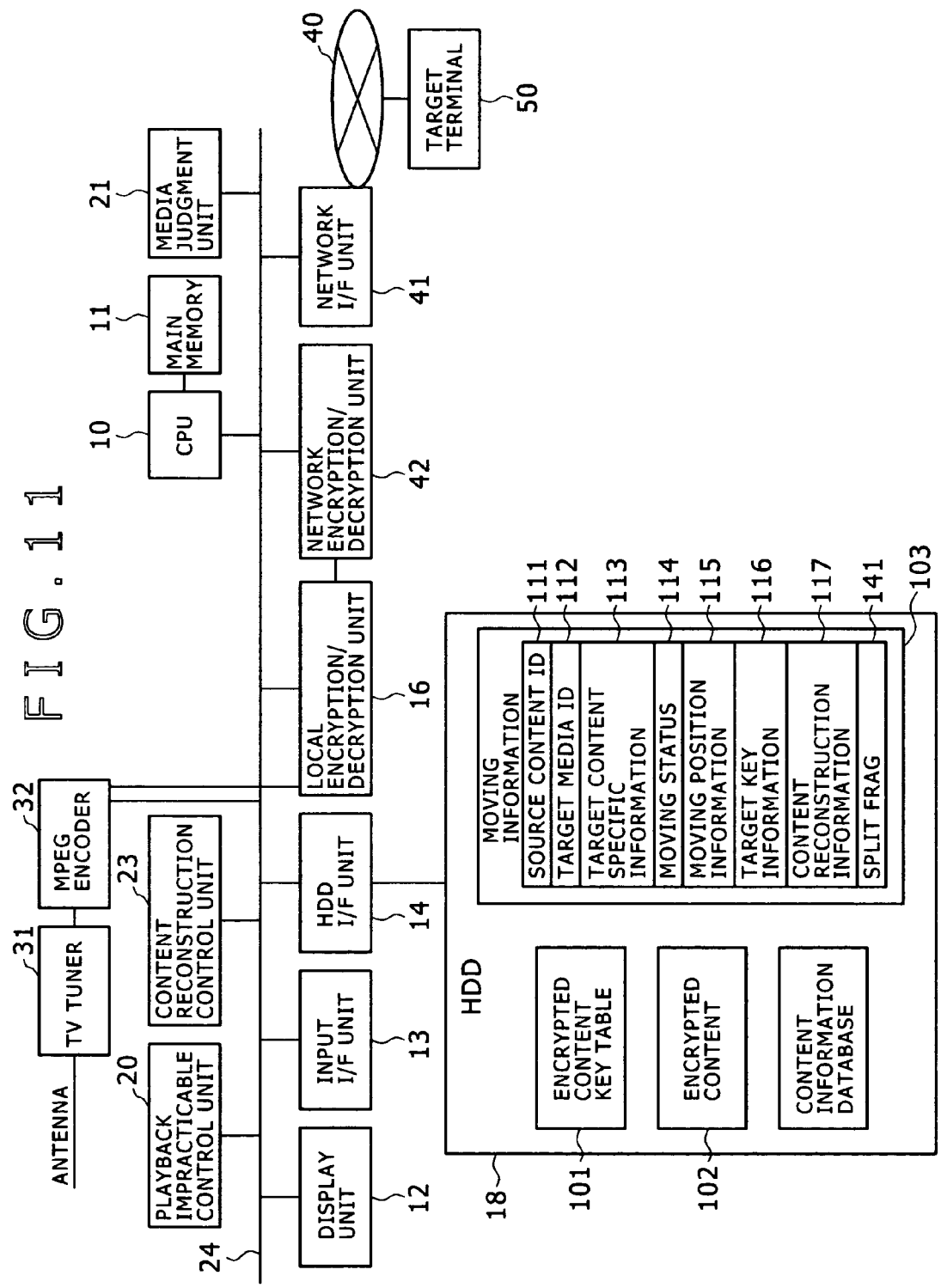

CONTROLLER TO MOVE CONTENTS AND CONTROL METHOD THEREOF

CLAIM OF PRIORITY

The present application claims priority from Japanese application P2004-375659 filed on Dec. 27, 2004, the content of which is hereby incorporated by reference into this application.

FIELD OF THE INVENTION

The present invention relates to a controller to move contents and a control method thereof, and in particular, it relates to management for moving contents in the event of failure occurrence for the case where the content as to which copyright protection is required is moved from an accumulation medium to another accumulation medium.

BACKGROUND OF THE INVENTION

With a communication means such as the Internet and digital broadcasting, there has been proposed a service which delivers contents such as movie and music. Data handled in such system is digitalized, and thus copying the data is performed easily. Therefore, it is important to protect the copyright of the contents. As one of the measures to protect the copyright, there is proposed a method in which the content is encrypted prior to being delivered.

In this method, the content is encrypted, for example, by use of a common key encryption system, and simultaneously a decryption key is created to decrypt the content having been encrypted. Since it is not possible to play back the encrypted content without the decryption key corresponding thereto, illegal usage of the content can be prevented and also the content copyright holder can be protected, by managing information in a form of combination between the decryption key and conditions to use the decryption key.

In the digital broadcasting, there is copy control information as a usage condition, and usage conditions such as "Copiable", "Copiable-for-one-generation", and "Copy-inhibited" are put into practice. Furthermore, the contents defined as "Copiable-for-one-generation" or "Copy-inhibited", as to which copying is limited, are protection targets. Therefore, when those contents are accumulated, it is necessary to encrypt the contents with a local encryption so as to protect the contents. Accumulating contents of "Copy-inhibited" has to be performed within a limited time of temporary storage allowable time. If the content of "Copiable-for-one-generation" is accumulated, it has to be accumulated with a condition of "Recopy-inhibited", and copying from the content defined as "Recopy-inhibited" is not permitted. However, since the accumulation medium is limited in capacity, the content with the copy control information of "Recopy-inhibited" after being accumulated is allowed to move. In moving the content for the above case, it is necessary to render playback of the source content impracticable, after the moving is completed. Also in the course of moving operation, the content having a length of over one minute should not be capable of being played back simultaneously on either the moving source side or the moving target side (according to the operational rules of ARIB; Association of Radio Industries and Businesses). As thus described, in moving the content, it is significant to control so that the volume of replayable content is not increased.

For instance, there are some methods which render playing back of a source content impracticable in the moving process. The first method is to sequentially erase the content data itself, which has already been moved. This method is carried out, for example, by overwriting the moved content area with particular data. The second method is to split the content into multiple regions and store the content with encryption keys varied by region. Then, only the key corresponding to the region having been moved is erased. With the second method, since the data to be erased is the key only, it is possible to sufficiently reduce the processing load, compared to the first method.

The third method is disclosed in JP-A No. 2003-101529. As shown in FIG. 2, this method is to split the content into multiple regions, and one region is provided to store keys (Keys 0 to 5) to encrypt the content. Then, by use of the key stored in the region for storing the keys, the contents is decrypted, and a new decrypting key is created based on the data obtained by decrypting the content. Subsequently, the newly created key is used to decrypt the content stored in the next region.

With the third method, once the region for storing the key stores a key to decrypt the first region of the content, a key for decrypting the next region can be created from the decrypted content data. Therefore, unlike the second method, it is not necessary to store keys with respect to each region of content. Furthermore, if playback of the content is rendered impracticable, the newly created key is stored in the region for storing the key. Accordingly, the content in the regions earlier than the current one cannot be decrypted, and the playback thereof is rendered impracticable.

According to the related art as described above, when the content of "copy-one-generation" is recorded on the accumulation device which is built in a device such as HDD (Hard Disk Drive), the content is set to be "Recopy inhibit". In the case where the content of "Recopy inhibit" is moved to a removable medium such as DVD, if the moving operation is interrupted in the course thereof, due to a power failure or a defect in the removable medium, playback of the contents on both the source side and the target side is rendered impracticable simultaneously, and thus there is no problem from the viewpoint of copyright protection. However, it results in the content itself being split into two parts of the source content and target content.

When a user tries to view the content in the status above, the user has to select the source content again after viewing the target content, if the user wishes to view what is continuing from the target content, and it is inconvenient for the user. After a lapse of long time, there is a possibility that the user may forget the correspondence between the source content and the target content, and the user may be forced to view a large number of contents little by little to search out the continuing content. Therefore, it is time-consuming and inconvenient.

SUMMARY OF THE INVENTION

An object of the present invention is to provide a controller to move contents and control method thereof, which combines contents having been split to reconstruct the content, even when the content is split due to a failure occurrence in the course of content moving. Another object of the present invention is to provide a controller to move contents and control method thereof, which are capable of combining contents into one content later, the content having been split due to a limitation of capacity of the accumulation medium or the like at the time of videotaping the content.

The present invention is directed to a controller to move contents that moves a content stored in a first storage unit to a second storage unit, including, playback impracticable means for rendering the content remaining in the first storage unit to be playback impracticable, the content corresponding to the content having been moved to the second storage unit, storing means for storing information regarding content movement, including information which specifies the content in the first storage unit and the second storage unit, selecting means for selecting one of continuously moving and reconstructing the content in the first storage unit, when a failure occurs, verifying means for verifying the second storage unit as a target and the content therein, by use of the information which specifies the second storage unit as a target and the content movement, and means for determining a range as to which one of continuing movement and reconstructing the content is performed, so as to continue one of the content movement the content reconstruction.

In a preferable example, the controller further includes judging means for judging a type of medium on which the second storage unit as a target is formed, and inhibiting means for inhibiting to reconstruct the content, when it is judged that the type of medium is incapable of rendering the content to be playback impracticable as a result of judgment by the judging means.

Further preferably, the controller includes display means for displaying selectable processing according to the information indicating a status of the content movement, and input means for allowing an input by a user's operation out of the processing displayed by the display means, wherein, the selecting means performs the processing in accordance with the input by the input means.

A management system to move contents that moves a content and accumulates the content in a medium, including first accumulating means for accumulating the content in a first medium, second accumulating means for accumulating in a second medium a split content obtained by splitting the content, at the time when the content is accumulated in the first medium, storing means for storing management information regarding the content movement, including at least information as to accumulating the split content in the second medium, information which specifies the second medium to accumulate the split content, and information which specifies the split content, verifying means for verifying the second medium and the split content, by use of the information which specifies the second medium and the split content, combining processing means for combining the content accumulated in the first medium with the content accumulated in the second medium, and means for rendering the split content accumulated in the second medium to be playback impracticable, when the combining processing is performed.

Preferably, when the storage capacity in the first medium is running low, the second accumulating means accumulates the split content to be stored subsequently, into the second medium that is different from the first medium, provided as a medium in the same device. Furthermore, when the storage capacity in the first medium is running low, the second accumulating means transmits the content to be stored subsequently, as a split content, to the second medium via a network, and accumulates the split content. The storing means stores information indicating a status whether or not there exists a content split and accumulated, information which specifies the second medium, and information which specifies the split content. The combining processing means reconstructs the split content received from the second medium via the network, and the content thus reconstructed is accumulated in the first medium.

A management method to move contents according to the present invention that moves a content between media, includes, a step of storing in a storage unit management information regarding content movement, a content moving step of performing processing to read out and move the content stored in a first medium and to write the content into a second medium, a checking step of checking whether or not an error occurs in the course of moving the content, a step of rendering the content existing in the first medium to be playback impracticable, the content corresponding to the content having been moved to the second medium, if it is determined that there is no error occurrence, a step of verifying the second medium as a target and the content, if it is determined as the error occurrence and the content movement is still continued, by use of information which specifies the second medium and information which specifies the content, both included in the management information, a grasping step of grasping a position where the content movement to the second medium is completed, so as to be aware of the position of the content from which the movement is to be started continuously, and a moving step of performing a processing to read out the content stored in the first medium corresponding to the position, and to write the content into the second medium.

In a preferable example, the contents moving management method further includes a step of creating key information used for encrypting the content in moving the content and storing the key information in the storage unit as one piece of the management information, and a step of writing the key information into the second medium, when the content movement to the second medium is completed.

Preferably, when an error occurs in the course of the content movement, the method further includes a step of producing a display to select processing including at least continuation of the movement and reconstruction of the content in the first medium, and a user is allowed to select the processing.

Further preferably, when the reconstruction of content is selected, the method further includes, a step of verifying the second medium as a target and the content, by use of the information which specifies the second medium and the information which specifies the content, both included in the management information, a grasping step of grasping a position from which the playback of the content in the first medium is possible, and also grasping the position of the content from which the reconstruction is to be started, and a step of performing content reconstruction processing which reads out the content stored in the second medium corresponding to the position, and writes the content into the first medium. The present invention is also directed to a program which is processed on a CPU, so as to execute the above methods.

According to the resent invention, even when the content is split due to a failure occurrence in the course of moving the content, it is possible to combine the split contents and reconstruct the content. Furthermore, after the failure occurrence, it is possible to properly continue moving the content, and also resume the content on the source side. In addition, the contents, having been split due to a limit of capacity of the accumulation medium at the time of videotaping the content, can be combined into one piece of content.

BRIEF DESCRIPTION OF THE DRAWINGS

Preferred embodiments of the present invention will now be described in conjunction with the accompanying drawings, in which:

FIG. 9 is a flowchart to detect a redundant part of contents when the size of content is different between the source and the target, according to the second embodiment of the present invention.

FIG. 10 is a diagram showing a configuration example of the controller to move contents according to the third embodiment of the present invention.

FIG. 11 is a diagram showing a configuration example of the system to move contents, according to the fourth embodiment of the present invention.

DETAILED DESCRIPTION OF THE PREFERRED EMBODIMENTS

Preferred embodiments of the present invention will be explained with reference to the accompanying drawings.

Example 1

Figure 1:
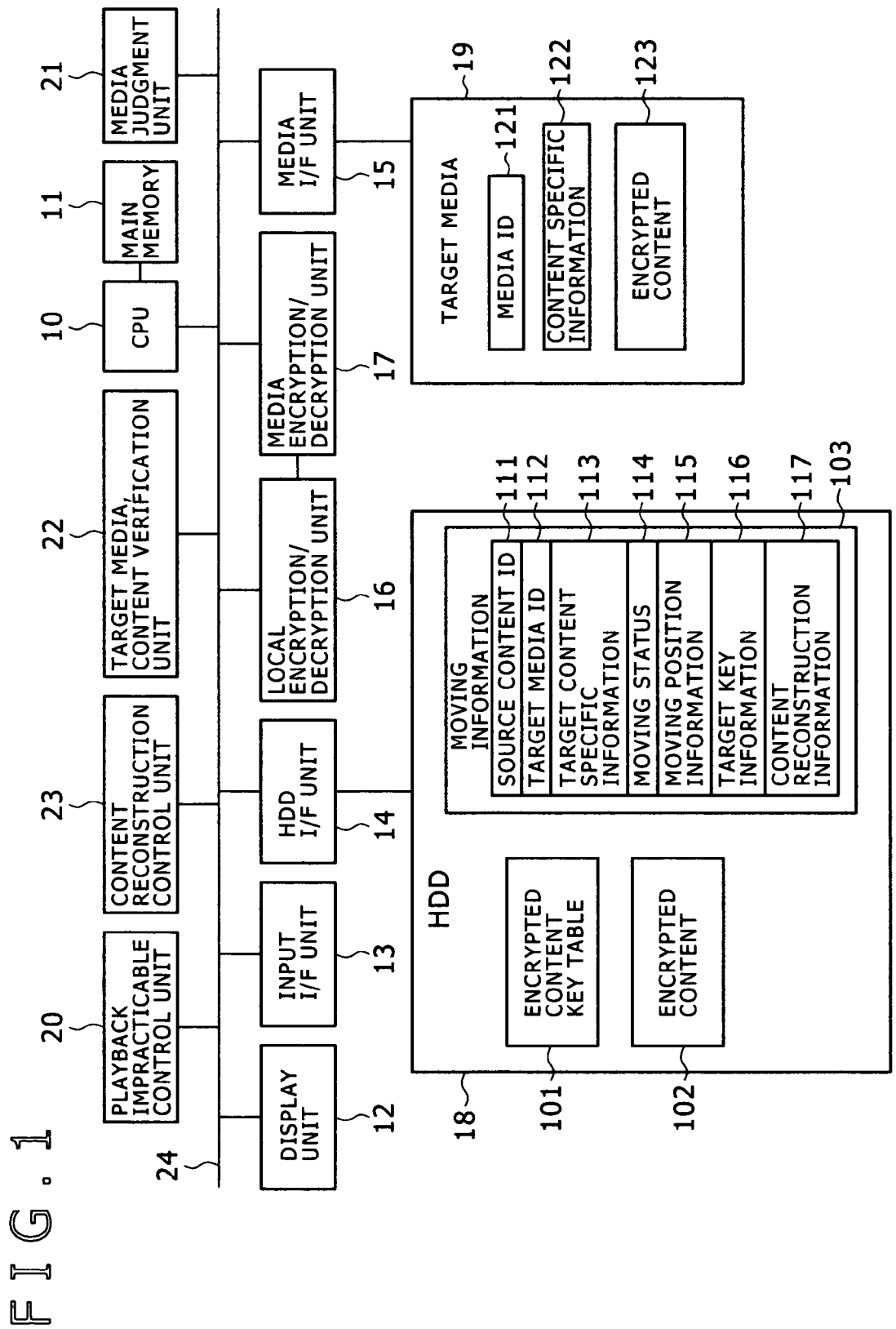
FIG. 1 is a diagram showing a configuration example of a controller to move contents according to the first embodiment of the present invention.
Figure 2:
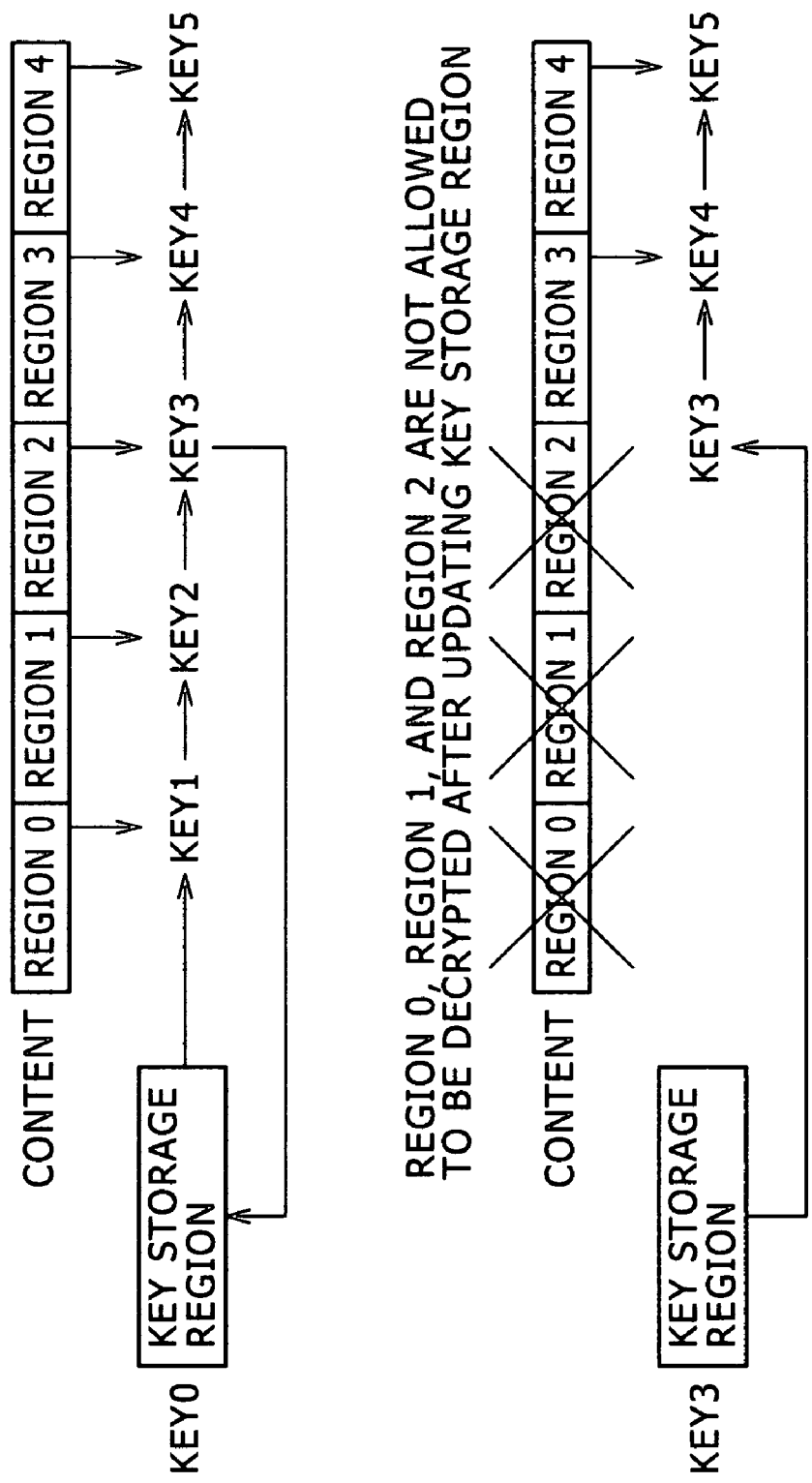
FIG. 2 is a diagram showing an example for rendering playback of a content impracticable.

FIG. 1 is a diagram showing a configuration example of a controller to move contents according to one embodiment of the present invention.

In FIG. 1, a system bus 24 connects, a CPU 10 which performs a predetermined operation by a program stored in advance, a main memory 11 which temporarily stores a work area and data to operate the program, a display unit 12 which displays information on a liquid crystal display unit or a TV set, an input I/F unit 13 to which a remote control, a mouse, a keyboard, and the like are connected, an HDD I/F unit 14 being an interface of HDD which stores contents, programs, and the like, a medium I/F unit 15 which is an interface of a removable medium such as DVD and HDD, a local encryption/decryption unit 16 which carries out encryption/decryption of the contents stored in the HDD, and a medium encryption/decryption unit 17 which encryption/decryption of the contents stored in the medium. In addition, the HDD I/F unit 14 is connected to an HDD 18 which stores contents and programs, and the medium I/F unit 15 is connected to a target medium 19 as a target of the content movement.

Furthermore, the controller includes a playback impracticable control unit 20 which renders playback of source content impracticable at the time of moving, a media judgment unit 21 which judges a type of medium connected to the medium I/F unit, a target media, content verification unit 22 which verifies the target medium and content, and a content reconstruction control unit 23 which reconstructs the content in the event of failure occurrence.

The HDD 18 stores an encrypted content key table 101 which stores information to create a key for decrypting the encrypted content stored in the HDD, an encrypted content 102, and moving information 103 which is management information used for moving the content.

The moving information 103 is management information which is created every time the content is moved. This moving information includes a source content ID 111 which specifies the source content, a target media ID 112 which specifies the target medium, and target content specific information 113 which specifies the content stored in the target medium. The target content specific information 113 includes an ID and a file name managed in the target medium. Furthermore, a moving status 114 indicating a status of the moving operation includes information indicating conditions such as "before moving start", "in the course of moving", "target medium writing error", "complete moving", "in the course of reconstructing", "reconstruction source medium writing error", and "complete reconstruction". The moving position information 115 indicates to what extent the moving operation has progressed, and includes information as to a file position of the content or time of the content, for instance. Target key information 116 is information required for creating a key to encrypt the target content, and includes key information for encrypting the target content or a part of information to create the key. Content reconstruction information 117 is information required to reconstruct the content.

The target medium 19 includes a media ID 121 which is an ID to specify the medium, content specific information 122 which specifies the content within the medium, and an encrypted content 123 which is stored in the medium.

Figure 3:
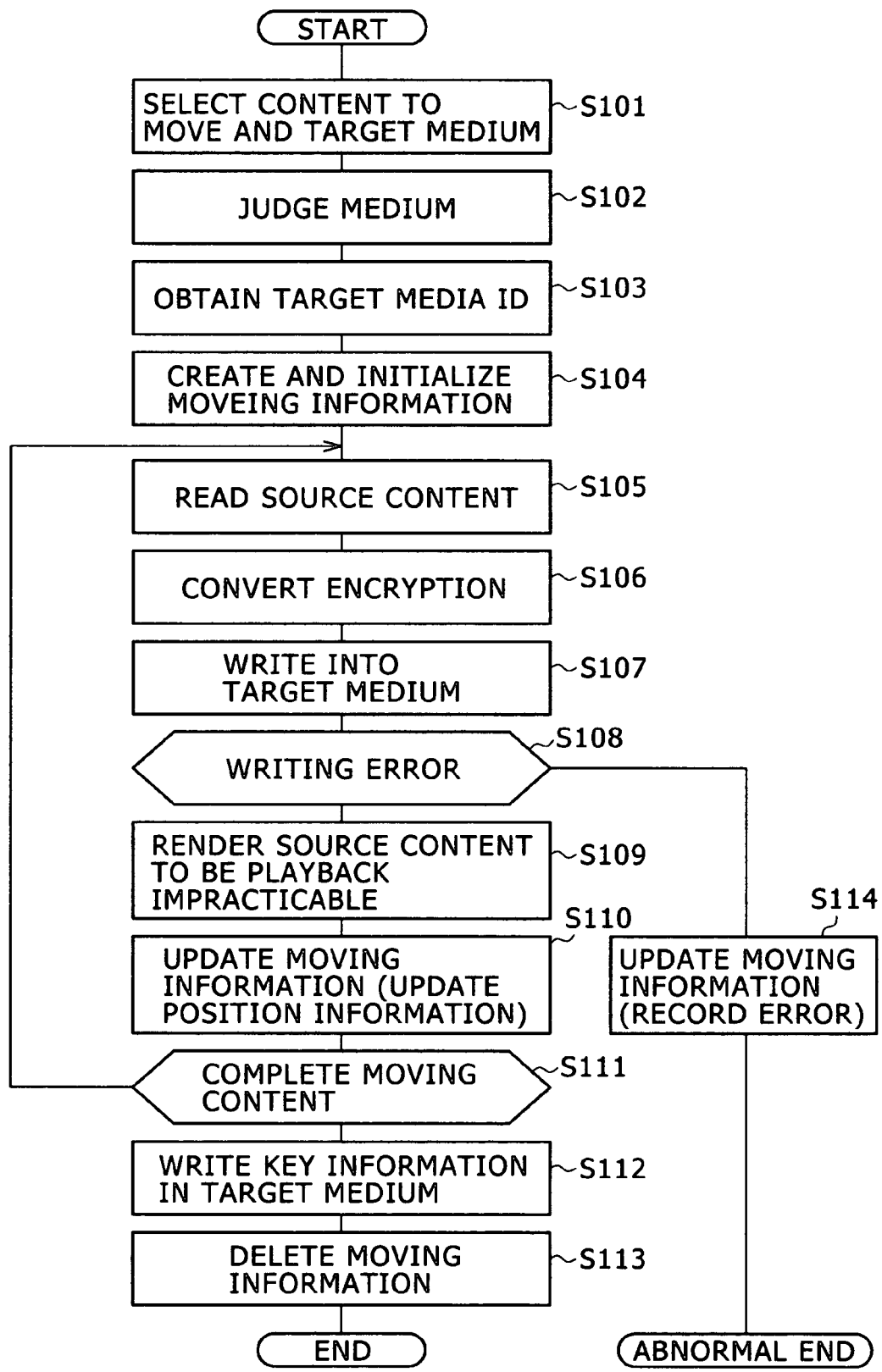
FIG. 3 is a flowchart showing an operation for moving the content.

FIG. 3 is a flowchart showing a moving operation of the content. With reference to FIG. 1 and FIG. 3, an operation for moving the content which requires a copyright protection will be explained. Firstly, a content to be moved and a target medium are selected (S101). This selection can be performed by displaying a list on the display unit 12 as to the contents being movable which are stored in the HDD 18, and a user makes a selection by use of an input device such as keyboard via the input I/F unit 13. As for the selection of the target medium, a list of media supported by this controller to move contents is displayed, and the user is allowed to make a selection. It is to be noted here that if there exists only one type of target medium and selection of a medium is unnecessary, and this selecting operation is not performed. Here, as a target medium, an optical disk such as DVD-RW and DVD-RAM, a removable HDD, or a silicon disk using FLASH ROM are available.

Next, a judgment of a medium is carried out (S102). Here, it is detected whether or not the medium selected by the user is set in the medium I/F 15, by use of the media judgment unit 21. If the medium is not set, the user is prompted to set the medium by displaying the status on the display unit 12. Furthermore, if the content as a moving object is the one which requires a copyright protection, it is also judged whether the medium complies with the copyright protection requirement.

Next, the CPU 10 obtains a media ID 121 from inside the medium as information to specify the medium via the medium I/F unit 15 (S103). Then, the moving information 103 is created so that the content can be reconstructed, in order to control the moving or to be prepared for failure occurrence, and this moving information 103 is stored in the HDD 18 (S104).

Information stored as the moving information 103 includes the following: Firstly, the source content ID 111 for specifying the source content is stored, and then, the media ID 121 obtained in S103 is stored as the target media ID 112. It is to be noted that a type of the target medium may be included in the target media ID. If multiple contents are stored in the target medium, the target content specific information 113 is stored as information to specify the content which is currently a moving object. Further, the target content specific information 113 includes an ID to specify the file name or the content, and it may be different by format for storing the content in the target medium.

Next, the moving status 114 is set from "before moving start" to the status which indicates "in the course of moving". As for the moving position information 115, the moving position is set to "0", since the moving starts from now on. The moving position information 115 may be a size of data having moved, if the file size of the content is the same on the source side and the target side. If the file size of the target content is changed from that of the source content, a time of the content is used as the moving position information 115. The target key information 116 stores information to create a key for encryption when the content is stored in the target medium. In this case, a part of the information for creating the key or a value obtained by encrypting the key for encryption with unique information for the device may be stored, instead of the key for encryption itself. The content reconstruction information 117 stores a position, in the event of failure occurrence, from which the source content can be played back and a halfway status of the content while it is reconstructed. Therefore, the content reconstruction information 117 stores a value as an initial value, which indicates that all the source contents are capable of being played back.

In the processing from step S105, an operation for moving the content is actually carried out. Firstly, the encrypted content 102 is read out from the HDD 18 (S105), and conversion of encryption is performed (S106). Generally, the content is subjected to encryption with a unique format (hereinafter, referred to as "local encryption") and stored in the HDD within the device. Since the local encryption is based on a unique format, the content is not available even if it is copied to another device. On the other hand, if the target medium is removable and compatibility between the devices is ensured, a format for encryption and a method for managing encryption key are predetermined. Therefore, it is necessary to convert the encryption scheme. For example, CPRM (Content Protection for Recordable Media) is employed as a method of copyright protection used for DVD-RW and DVD-RAM.

In step S106, firstly the CPU 10 reads out, from the encrypted content key table 101, a key corresponding to the encrypted content, which is read out in S105, and sets this key in the local encryption/decryption unit 16. Then, the CPU transfers the encrypted content to the local encryption/decryption unit 16 via the system bus 24, and decrypts the encrypted content.

Next, the CPU 10 sets in the medium encryption/decryption unit 17, a key for encryption complying with the copyright protection format of the target medium, in order to store the content in the target medium 19. Then, the CPU inputs the content decrypted in the local encryption/decryption unit 16 in the medium encryption/decryption unit 17 and encrypts the content. At this stage, the decrypted content is not inputted via the system bus 24 but it is directly inputted from the local encryption/decryption unit 16 into the medium encryption/decryption unit 17. This processing is necessary in the case where the system bus 24 is freely accessible from any user, and by monitoring the bus, it is possible to prevent extraction of content which is not encrypted.

In the CPRM, which is a method of copyright protection used for DVD-RW or DVD-RAM, a key utilized for encrypting the content is created according to the following manner: Firstly, a device key held by the device is used to create a medium key, by use of a medium key block stored in the region of DVD available for reading only, called as read-in area. A title key is created by use of this medium key and a media ID together with a random number, and the title key is encrypted and stored in the medium. Then, a key for encrypting the content is created by use of the title key, copy control information, and title key conversion data multiplexed in the content. In this way, since the media ID is used to create the medium key, a key for decrypting the content cannot be created even though the data of content is stored on another medium by bit. Therefore, it is not possible to use the content.

When the CPRM is employed, the title key encrypted as target key information 116 is reserved, and in the medium encryption/decryption unit 17, the title key is set as a key to encrypt the key, which is created from the title key conversion data multiplexed in the content and the title key decrypted from the encrypted title key.

Next, the encrypted content is written in the medium (S107). Then, it is checked whether or not an error has occurred in writing (S108), and if there has been an error, the moving status 114 of the moving information 103 is set to a value indicating the status "target medium writing error", and the processing is ended (S114).

On the other hand, when writing into the medium is successfully completed, the source content is rendered to be playback impracticable by use of the playback impracticable control unit 20 (S109), and position information from which the playback is possible is set in the content reconstruction information 117. If the encrypted content key table 101 stores multiple content keys respectively corresponding to multiple regions obtained by splitting the content, the content key corresponding to the above source content is erased. At this stage, the content key is erased so that replayable contents do not redundantly exist on the source side and the target side for one minute or more. Then, the moving position information 115 of the moving information 103 is set to the position where the writing is completed (S110).

Next, it is judged whether or not the moving of the content has been completed (S111). If the moving has not been completed yet, the processing returns to step S105, and the moving operation is continued. On the other hand, if the moving of the content has been completed, the key information is written in the target medium, and the moving status of the moving information 103 is updated to a value indicating "complete moving" (S112). Then, the completion of the moving processing is confirmed and the moving information 103 is deleted. Then, the processing is ended (S113).

Figure 4:
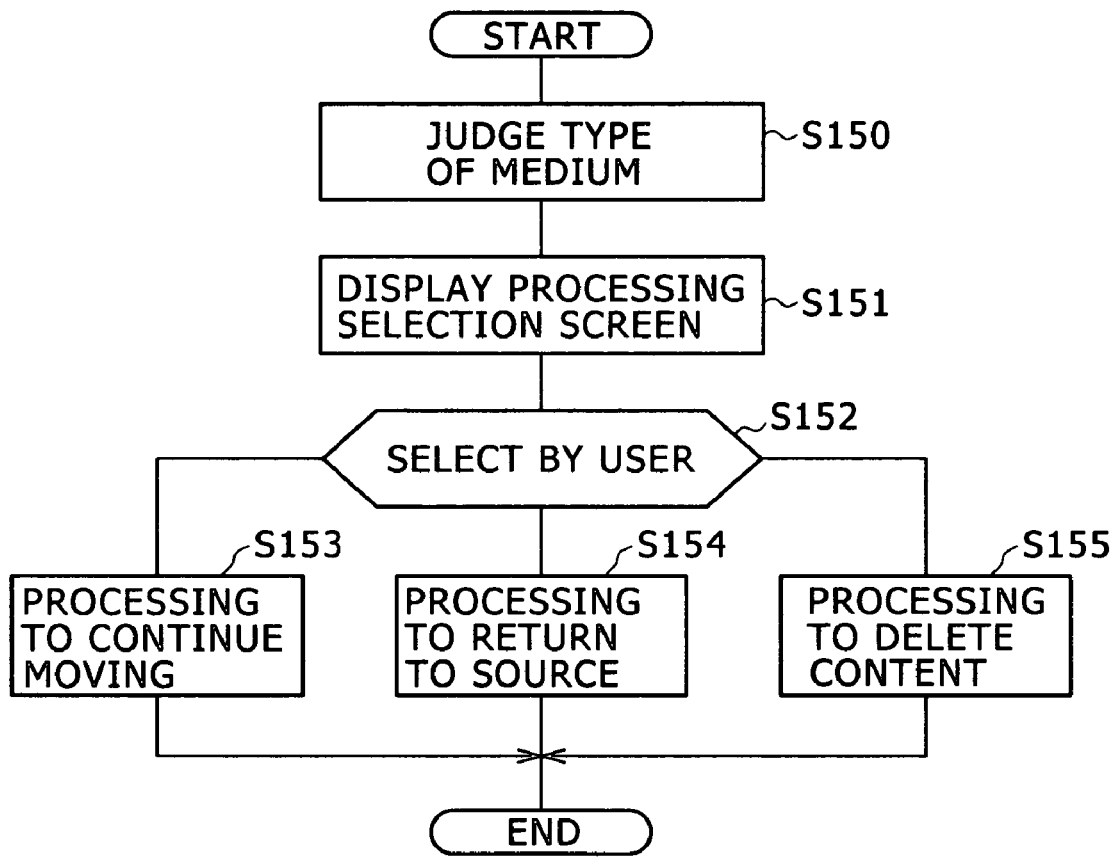
FIG. 4 is a flowchart showing a processing operation of failure recovery.
Figure 5:
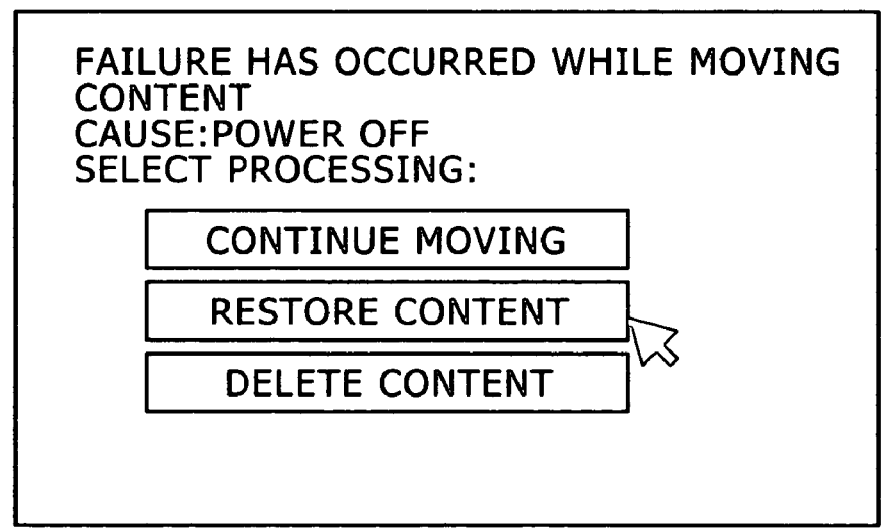
FIG. 5 is an illustration showing an example of selection screen for failure recovery.

Next, with reference to FIG. 4 and FIG. 5, processing when the failure occurs will be explained. FIG. 4 is a flowchart showing a processing operation of failure recovery, and FIG. 5 is an illustration showing an example of selection screen for failure recovery. Firstly, a type of the target medium is judged (S150). Then, a selection screen for the processing in the event of failure occurrence is displayed on the display unit 12 (S151).

FIG. 5 shows an example of selection screen how to handle the failure. In this example, as processing for recovery, "Continue moving", "Reconstruct the content", and "Delete the content" are presented. When the "Continue moving" is selected, the moving processing performed at the time of failure occurrence is continued from that point. When the "Reconstruct the content" is selected, moving processing performed in the event of failure occurrence is terminated, and the part of the content having already been moved is returned to the source, so that the content is reconstructed to be an original. When "Delete the content" is selected, the moving process performed in the event of failure occurrence is terminated, and the content as a moving object is deleted.

As shown in the example of screen of FIG. 5, it is also possible to display the cause of an error as information to prompt the user to select the recovery processing. Furthermore, if the type of the target medium judged in step S150 is a medium unavailable for being rendered playback impracticable, the item "Reconstruct the content" is not presented. This is because, if the target medium is not available for being rendered playback impracticable, it is not possible to move the content from the target medium to the source medium.

In addition, there are considered factors of failure, such as power shutdown due to a blackout during the moving operation, writing error due to a defect of a medium, and writing error due to a limit of medium capacity. At the time of power shutdown, a moving status 114 of the moving information 103 is checked when the device is started after the power recovery, and it is verified whether or not the moving has been performed. If the moving has not been performed, the device is started according to a normal sequence.

If the value of the moving status 114 is "in the course of moving", there is a possibility that the power is shut off, and thus the processing as shown in FIG. 4 is performed. The processing as shown in FIG. 4 is also performed in the case where writing error due to the medium defect or capacity over occurs, or in the case where the moving status 114 of the moving information 103 is checked when the device is started, and the status indicates "target medium writing error". Since it is highly possible in the case above that an error occurs in writing into the medium, only the items "Reconstruct the content" and "Delete the content" may be displayed without displaying the item "Continue moving" as shown in FIG. 5. Alternatively, the number of moving retry counts is added to the moving information 103 to store the number of counts the processing of "Continue moving" has been performed. Then, if the error still occurs even after the processing "continuing moving" is performed for a certain number of counts or more, the item "Continue moving" may not be displayed in FIG. 5, so that the user cannot select this item.

Returning to FIG. 4, in selecting the processing in the selection screen, the user is allowed to select the processing by use of the input device such as a keyboard (S152). When the item "Continue moving" is selected, the moving process is continued from the point that the failure occurred (S153). When the item "Reconstruct the content" is selected, a processing to restore the source content is performed (S154). When the item "Delete the content" is selected, the processing to delete the content is performed (S155).

Figure 6:
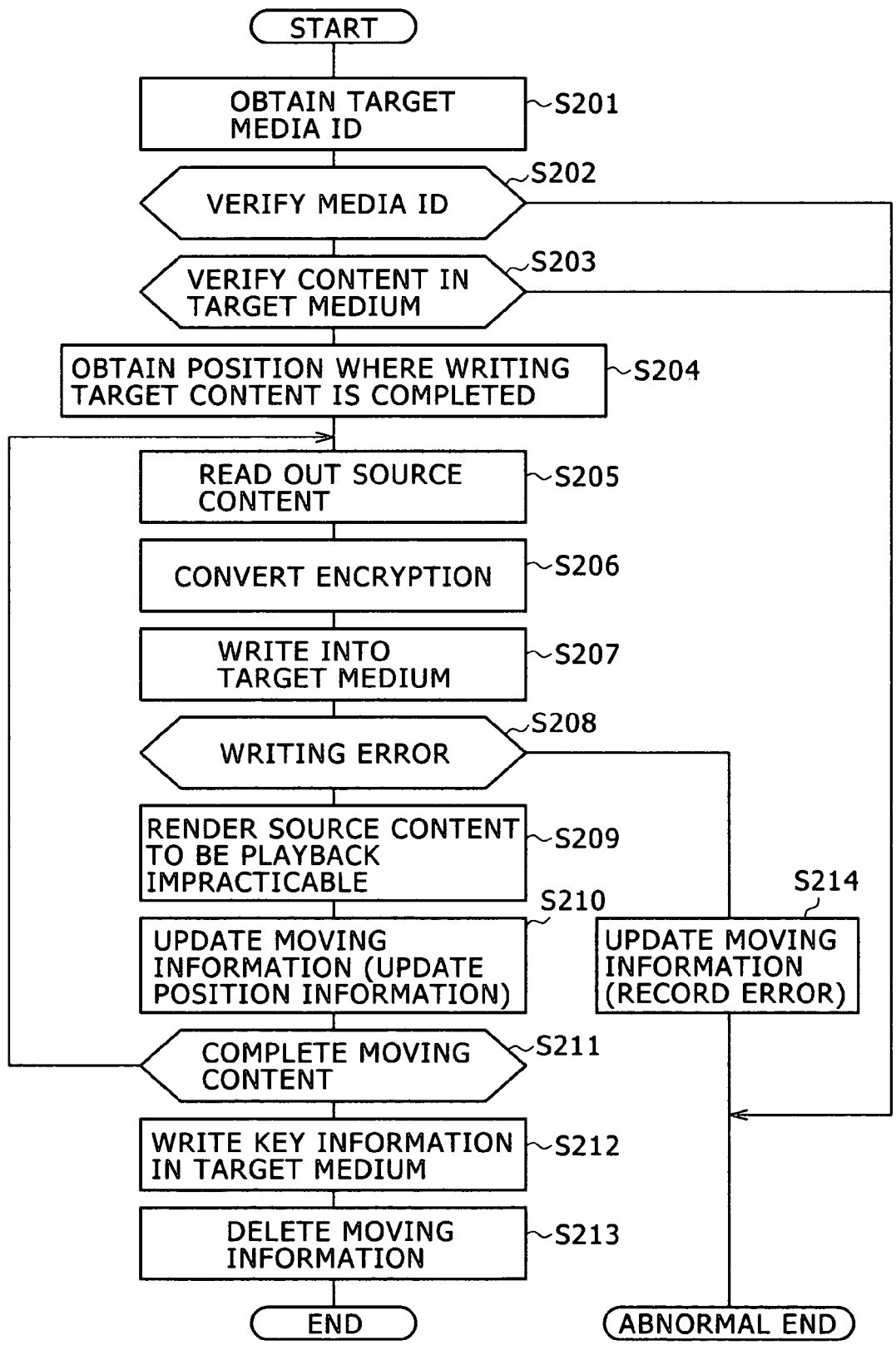
FIG. 6 is a flowchart showing a processing operation to continue moving.

With reference to FIG. 1 and FIG. 6, processing to continue moving will be explained in detail. In the processing to continue moving, firstly, the target media ID 121 is obtained (S201). Then, the target media ID 112 stored in the moving information and the media ID 121 thus obtained are compared to each other, and the media ID is verified (S202). As a result of this comparison, if those media IDs do not agree with each other, it is determined as an error, and the processing is terminated.

On the other hand, if those media IDs agree with each other, it is verified whether there exists content in the course of moving, being stored in the target medium (S203). At this stage, it is also verified whether the content agrees with the content in the target content specific information 113 stored in the moving information. As a result of the verification, if there is not an agreement, it is determined as an error and the processing is terminated similarly to step S202. On the other hand, if there is an agreement, the processing proceeds to the next step. As for the processing above, since there is a possibility that the medium is changed by a user in the case where the moving is interrupted due to the power shutoff, it is necessary to conduct verification. Further, in the case where moving is continued sequentially due to the medium writing error without changing the medium, the processing above is not necessary.

Next, a write complete position is obtained, which indicates up to where the content has been written in the target medium (S204). In actual writing, there is a possibility that the data of the content is subjected to buffering in the medium I/F unit 15 and the like, and thus it is important to check up to where the data has been written actually. After obtaining the write complete position, the moving is started from this position according to the following processing.

Firstly, the source encrypted content 102 is read out from the HDD 18 (S205), and conversion of encryption is performed (S206). In other words, in step S206, the CPU 10 reads out from the encrypted content key table 101, a key corresponding to the encrypted content 102 having been read out and sets the key in the local encryption/decryption unit 16. Next, the encrypted content 102 is transferred to the local encryption/decryption unit 16 via the system bus 24, so as to decrypt the encrypted content. Next, in order to store the content in the target medium 19, the CPU 10 sets in the medium encryption/decryption unit 17, a key for encryption complying with the copyright protecting method of the target medium, and inputs the content having been decrypted in the local encryption/decryption unit 16, in the medium encryption/decryption unit 17 and encryption of the content is performed.

Next, the encrypted content is written in the medium (S207). Then, it is checked whether or not there has been an error in writing (S208). As a result of the checking, if there is an error, the moving status 114 of the moving information 103 is set to a value indicating the status "target medium writing error", and the processing is ended.

On the other hand, if the writing has been successfully completed, the source content is rendered to be playback impracticable by use of the playback impracticable control unit 20 (S209), and information of replayable position is set in the content reconstruction information 117. If the encrypted content key table stores multiple content keys respectively corresponding to multiple regions obtained by splitting the content, the content key in the corresponding region is erased. Then, the moving position information 115 of the moving information 103 is set to a value indicating the position the writing has been completed (S210).

Thereafter, it is judged whether or not the moving of the content has been completed (S211). As a result of the judgment, if the moving has not been completed yet, the processing returns to the step S205 and the moving operation is continued. On the other hand, if the moving of the content has been completed, the key information is written in the target medium, and the moving status of the moving information 103 is updated to a value indicating "moving completed" (S212). Next, after it is confirmed that the moving processing has been completed, the moving information 103 is deleted and the processing is ended (S213).

Figure 7:
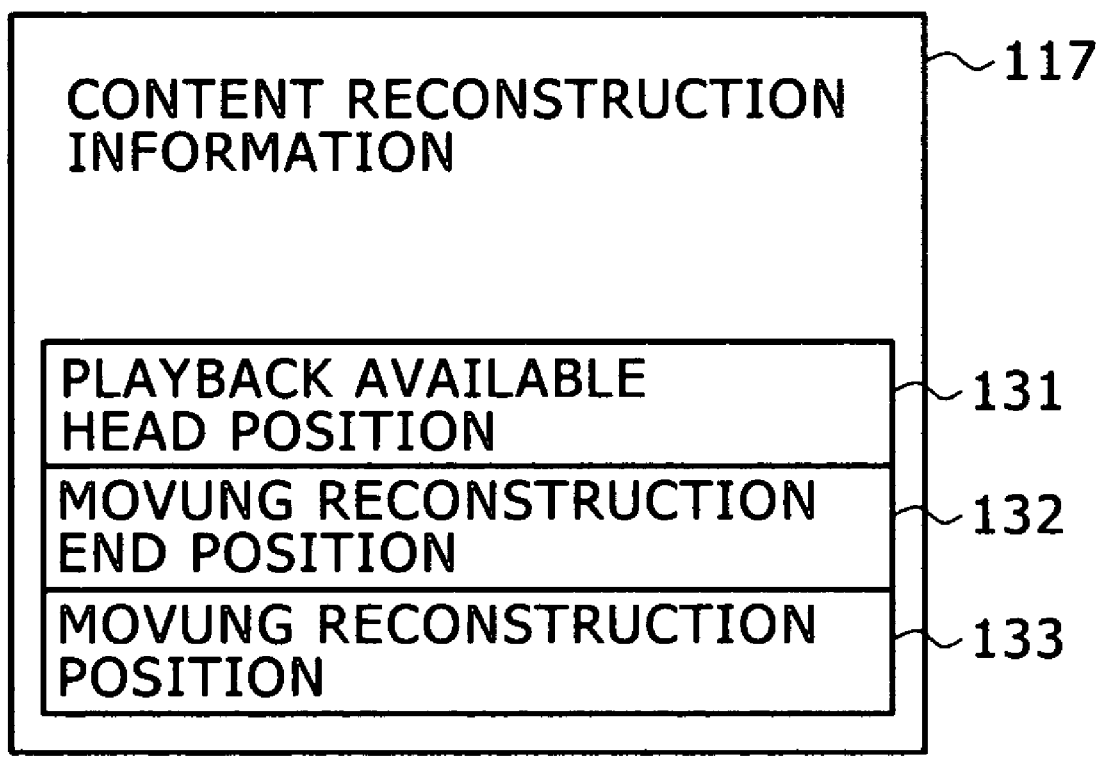
FIG. 7 is a diagram showing details of content reconstruction information.
Figure 8:
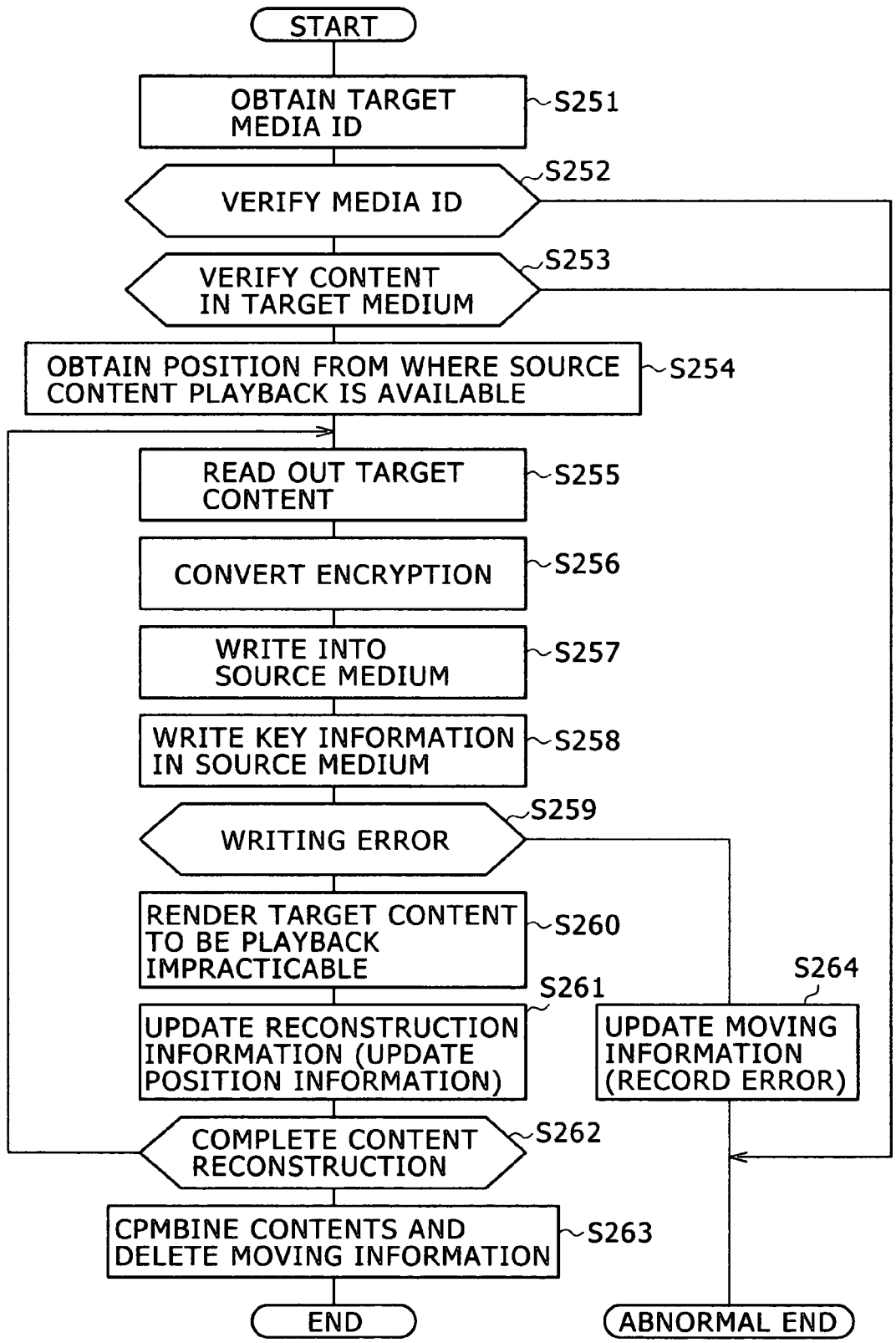
FIG. 8 is a flowchart showing a processing operation to reconstruct the content.

Next, with reference to FIG. 1, FIG. 7 and FIG. 8, details for reconstructing the content will be explained. FIG. 7 shows details of content reconstruction information. FIG. 8 is a flowchart showing a processing operation to reconstruct the content. In FIG. 7, reference numeral 131 indicates a playback available head position, indicating a head position from which the source content can be played back, numeral 132 indicates a moving reconstruction end position indicating an end position up to which the reconstruction is to be performed, and numeral 133 indicates a moving reconstruction position up to which the reconstruction has been performed.

In FIG. 8, firstly in the content reconstruction processing, a target media ID 121 is obtained (S251). Then, the target media ID 112 stored in the moving information is compared with thus obtained media ID, and verification of the media ID is performed (S252). As a result of the verification, if those media IDs do not agree with each other, it is determined as an error and processing is terminated. On the other hand, if those media IDs agree with each other, it is verified in the target media, contents verification unit 22, whether or not there exists a content in the course of moving being stored in the target medium (S253).

At this stage, it is verified whether or not the content agrees with the content in the target content specific information 113 stored in the moving information. If there is no agreement, it is determined as an error and the processing is terminated in a similar manner shown in S252. On the other hand, if there is an agreement, the processing proceeds to the next step. As for the processing above, since there is a possibility that the medium is changed by a user in the case where the moving is interrupted due to the power shutoff, it is necessary to conduct verification. Further, in the case where moving is continued sequentially due to the medium writing error without changing the medium, the processing above is not necessary.

If the target medium is a DVD-RW or a DVD-RAM, and moving is performed according to the CPRM, with the title key having already been written in, a backup of the content is made from the DVD onto another medium prior to performing the content reconstruction processing, and moving the content from the DVD to HDD, then it is copied again from HDD to DVD, resulting in that playing back of the content becomes possible from the DVD. Therefore, when the title key is already written in the DVD, it should be controlled so that the reconstruction of the content cannot be carried out. In order to achieve the content reconstruction from the medium, a mechanism is required in which the user is not allowed to read out logically all or some of the information to create a key for decrypting the encrypted content stored in the medium. Accordingly, it is also verified whether or not the title key is stored in the medium, and if it is stored, the processing is terminated.

Next, it is read out from the playback available head position 131 of the content reconstruction information 117 in the moving information 103, from where playback of the source content is available, and this position is stored in the moving reconstruction end position 132 (S254). Accordingly, it is determined up to where the content is to be restored from the head thereof.

Next, the encrypted content 123 is read out from the target medium (S255), and conversion of encryption is performed in S256. The CPU 10 creates a key to decrypt the encrypted content complying with the copyright protection method of the target medium, by use of the target key information of the moving information 103, and sets the key in the medium encryption/decryption unit 17. Then, the CPU transfers the encrypted content 123 to the medium encryption/decryption unit 17 and decrypts the encrypted content (S256). Next, the CPU 10 creates a key for local encryption and stores it in the local encryption/decryption unit 16. Then, the content decrypted in the medium encryption/decryption unit 17 is encrypted in the local encryption/decryption unit 16.

Next, the local encrypted content is written in the HDD as a source (S257), and a key associated with the content thus written is added to the encrypted key table (S258). Then, it is checked whether or not there has been an error in writing (S259). As a result of checking, if there is an error, the moving status 114 of the moving information 103 is set to a value indicating "source medium writing errors" and processing is ended (S264). On the other hand, if the writing has been successfully performed, the target content is rendered to be playback impracticable by use of the playback impracticable control unit 20 (S260).

Then, the moving reconstruction position 133 of the moving information 103 is set to the value indicating the position where the writing has been completed (S261). It is judged whether the reconstruction of the content has been completed or not by checking the moving reconstruction end position 132 (S262). As a result of the judgment, if the reconstruction of the content has not been completed yet, the processing returns to the step S255, and the moving operation is continued. On the other hand, if moving of the content has been completed, the key information is written in the target medium and moving status of the moving information 103 is updated to a value indicating "Reconstruction completed", and the contents are combined. Then, after confirming that the reconstruction processing is completed, the moving information 103 is deleted and the processing is ended (S263).

Example 2

Next, referring to FIG. 9, detecting a redundant part of contents will be explained in the case where the format of the contents is different between the source and the target and a size of the source content is different from that of the target content. The content in the target medium may be different in format depending on the target medium itself and a method of copyright protection thereof, and thus it may be different from the source content in size. For example, information for creating a key for decryption may be multiplexed in the data of the content, and in that case, the target content becomes larger in size than the source content. In this case, if the contents are combined to be adjusted only in size-wise when moving of the content is continued or the content is reconstructed, there is a possibility that the image may become irregular on the joined part. In order to handle this situation, the start position for combining the contents is decided according to the following processing. Here, explanation will be made as to a case where the content is reconstructed, and the content is compressed using the MPEG 2 standard.

Firstly, the playback available head position 131 of the content reconstruction information 117 in the moving information 103 is read out, and a head of GOP (Group of Pictures) from the playback available head position of the source content in the HDD is searched out (S301). Next, a time stamp (presentation time) at the head of GOP having obtained in step S301 is also obtained (S302).

Next, a GOP starting from the time stamp obtained in S302 is searched out from the target content (S303). As a result of the searching, if GOP starting from the same time stamp is found, the position immediately before the GOP starting from the time stamp is recorded as a moving reconstruction end position (S304).

On the other hand, as a result of the searching, if the GOP starting from the same time stamp is not found, a complete GOP (data of which is not cut off in midstream) is searched out from the end of the target content having already been recorded (S305). Then, the end position of the complete GOP thus searched out is recorded as a moving reconstruction end position (S306). However, if a GOP starting from the same time stamp is not found, a part of the content is missing. With the processing as described above, even if the format for storing the content is different, it is possible to specify up to where the content should be restored, and the content can be reconstructed.

Example 3

FIG. 10 is a diagram showing a configuration example of a device which combines split contents later, when the content is stored in a split manner when it is recorded. As for the elements as shown in FIG. 10 which are different from those in FIG. 1, reference numeral 31 indicates a TV tuner which receives TV broadcasting, numeral 32 indicates an MPEG encoder which compresses the broadcasted data into the MPEG format, and numeral 141 indicates a split flag showing whether or not the content is stored in a form of being split at the time of recording.

Hereinafter, an operation of the device will be explained. Firstly, when the content is recorded, the content of TV program received by the TV tuner 31 is compressed using the MPEG encoder 32, and the compressed content is subjected to local encryption by the local encryption/decryption unit 16. Then, it is stored in the HDD 18 via the HDD I/F unit 14. In the case of digital broadcasting, the content received by the tuner is data already compressed. Therefore, it is not necessary to involve the MPEG encoder 32, and the content is allowed to be inputted directly in the local encryption/decryption unit 16.

Next, when the capacity of HDD 18 becomes full while recording, due to an extension of a program, and the content cannot be stored any more, the subsequent content is stored in the target medium. The operation is as the following. That is, when the CPU 10 determines that no more content can be stored in the HDD 18, the moving information 103 indicating the information as to splitting is stored in the HDD 18. The following information is stored as moving information 103.

Firstly, a value "split status" indicating that the content has been split and stored, is set to the split flag 141, and the source content ID 111 is stored to specify the content currently stored in the HDD 18 as a split source. Then, a target media ID 121 which specifies the target medium 19 as a split target medium on which the content is to be stored. At this stage, it is also possible to include a type of medium as a split target.

When multiple contents are stored in the medium being a split target, target content specific information 113 is stored as information to specify the content in the split target. The target content specific information may include a file name, ID or file name to specify the content, and this information varies depending on a content storing format of the split target medium.

Furthermore, information of an end position stored in the HDD 18 being a split source at the stage of conducting splitting is set in the moving position information 115. The information stored in the moving position information 115 is to set a position and time of the content file. The target key information 116 stores information to create a key for encryption when the content is stored in the target medium 19.

In addition, it is also possible to store some of the information to create the key, or a value which is obtained by encrypting the key for encryption, by use of unique information as to the device, instead of the key value itself used for encryption. Since the content reconstruction information 117 stores a status in which the content is combined later, the same value as the split position information is stored as an initial value. After the moving information 103 as to the content is stored, the subsequent content is stored in the target medium 19.

At this stage, the content is inputted from the TV tuner 31 into the MPEG encoder 32, and the data is compressed and inputted into the medium encryption/decryption unit 17 via the local encryption/decryption unit 16. Then, the content is subjected to the encryption complying with the copyright protection method of the target medium, and stored in the target medium 19 via the medium I/F unit 15. In this case, since the local encryption is not necessary, the content may be directly inputted into the medium encryption/decryption unit 17 and subjected to the encryption. As thus described, in the case of running short of capacity in the HDD 18, the content can be split and stored in a different medium.

Next, after recording the content, an operation to reconstruct the content thus split will be explained. Firstly, the split flag 141 stored in the moving information 103 is checked, and it is judged whether the flag indicates "split status". If it is not a "split status", there is no split content, and the processing is ended. If it is a "split status", the target media ID 121 of the split target is obtained first. Then, the obtained target media ID is compared with the target media ID 112 stored in the moving information 103. As a result of comparison, if the media IDs do not agree with each other, it is determined as an error and the processing is terminated. On the other hand, when the media IDs agree with each other, it is verified whether or not there exists a split content stored in the target medium by the target media, content verification unit 22. At this stage, it is verified whether or not the content agrees with the content in the target content specific information 113 stored in the moving information 103.

Next, the encrypted content 123 is read out from the split target medium. The CPU 10 sets a key for decrypting the encrypted content complying with the copyright protection method of the split target medium 34 in the medium encryption/decryption 17, by use of the moving target key information 116 and the like in the moving information 103. Then, the encrypted content 123 is transferred to the medium encryption/decryption unit 17, and the encrypted content is decrypted. Next, a local encryption key for storing the content in the HDD 18 is created, and it is set in the local encryption/decryption unit 16. Then, the content decrypted in the medium encryption/decryption unit 17 is subjected to the encryption in the local encryption/decryption unit 16.

Next, the content locally encrypted is written in the HDD 18 being a split source, and a key corresponding to the content thus written is added to the encryption key table 101. Then, by use of the playback impracticable control unit 20, the split target content is erased and the content is rendered to be playback impracticable. Subsequently, the content reconstruction information 117 of the moving information 103 is set to a value of the position where the writing has been completed. The processing above is performed repeatedly until all the split target contents are processed. When moving of the split target contents is completed, the moving information 103 is deleted and processing is ended.

With the processing as described above, after completion of recording the content having been split at the time of recording, it is possible to reconstruct the content, when the capacity of the HDD is increased by deleting other contents or the like.

Example 4

FIG. 11 is a diagram showing a configuration example of the device which splits the content at the time of recording, stores the split content to another terminal via a network, and later, combines the split contents into one piece of content. In FIG. 11, reference numeral 40 indicates a network to which the terminal 50 is connected, numeral 41 indicates a network I/F unit which is connected to the network and sends/receives data, numeral 42 indicates a network encryption/decryption unit which performs encryption/decryption at the time of content sending/receiving via the network, numeral 50 is a split target terminal connected to the network, and numeral 141 indicates a split flag which shows whether or not the content is split and then stored at the time of recording. Hereinafter, the operation will be explained.

Firstly, when the content is recorded, the content of TV program received by the TV tuner 31 is compressed by the MPEG encoder 32, then subjected to local encryption by the local encryption/decryption unit 16, and stored in the HDD 18 via the HDD I/F unit 14. Furthermore, in the case of digital broadcasting, the content received by the tuner is data already compressed. Therefore, it is not necessary to involve the MPEG encoder 32, and the content is allowed to be inputted directly in the local encryption/decryption unit 16.

Next, when the capacity of HDD 18 becomes full while recording, due to an extension of a program, and the content cannot be stored any more, the subsequent content is stored in the split target terminal 50. The operation is described as the following. That is, when the CPU 10 determines that any more content cannot be stored in the HDD 18, the moving information 103 indicating the information for split operation is stored in the HDD 18.

The following information is stored as the moving information 103. Firstly, a value "split status" indicating that the content has been split and stored is set to the split flag 141, and the source content ID 111 is stored to specify the content currently stored in the HDD 18 being a split source. Then, a split target terminal ID which specifies the split target terminal 50 on which the content is to be stored is stored in the target media ID 112. At this stage, an ID which uniquely specifies the split target terminal is stored. For example, it is possible to use the MAC address employed in the network I/F.

When multiple contents are stored in the split target terminal, the target content specific information 113 is stored as information to specify the content in the split target. The target content specific information 113 may include a file name, ID, and the like, to specify the content, and this information varies depending on a content storing format and a content management method of the split target terminal 50. In addition, the moving position information 115 is set with information of an end position stored in the HDD 18 being the split source when the split operation is conducted. A position and time of the content file are set as the information stored in the moving position information 115. Since the content reconstruction information 117 stores a status for reconstructing the content later, it stores as an initial value, the same value as the split position information.

After the moving information 103 of the content is stored, the subsequent content is transferred to the split target terminal 50. At this stage, the content is inputted from the TV tuner 31 into the MPEG encoder 32, and the data is compressed. Then, the data thus compressed is inputted into the network encryption/decryption unit 42 via the local encryption/decryption unit 16, and it is subjected to the encryption complying with the copyright protection method for transferring the content to the network. Then, the content is transferred to the network 40 via the network I/F unit 41, and further transferred to the split target terminal 50. At this stage, since the local encryption is not necessary, the content may be directly inputted in the network encryption/decryption unit 42 and subjected to encryption. In this way, even in the case of running short of capacity in the HDD, the content can be split and then stored in a different terminal which is connected to the network 40.

Next, an operation will be explained, in which the split contents are reconstructed into the original content after recording the content is completed. Firstly, the split flag 141 stored in the moving information 103 is checked, and it is judged whether the flag indicates "split status". If it is not "split status", there is no split content, the processing is ended. If it is "split status" as a result of judgment, an ID for specifying the terminal is obtained from the split target terminal 50. Then, the ID thus obtained is compared with the ID specifying the split target terminal based on the target media ID 112 stored in the moving information 103. As a result of the comparison, if the IDs do not agree with each other, it is determined as an error and the processing is terminated. Then, accessing the split target terminal 50, it is requested to transfer the content of the target content specific information 113 stored in the moving information 103. At this timing, it is requested that the content is transferred in a mode of moving. Consequently, if transferring cannot be performed in the mode of moving, a content requiring the copyright protection cannot be combined. Therefore, the processing is ended.

Next, the CPU 10 authenticates the key for decrypting the encrypted content complying with the copyright protection method for network transfer, and shares the key with the split target terminal 50. Then, the CPU 10 sets the key in the network encryption/decryption unit 42. Then, the encrypted content is received by the network I/F unit 41 from the split target terminal 50, transfers the content to the network encryption/decryption unit 42, and decrypts the encrypted content. Next, a key for local encryption for storing the content in the HDD is created and set in the local encryption/decryption unit 16. Then, the content decrypted in the network encryption/decryption unit 42 is subjected to encryption in the local encryption/decryption unit 16. Furthermore, since the split target terminal 50 performs the transfer in the mode of moving, the content having been transferred is sequentially rendered to be playback impracticable. Next, the content having been subjected to local encryption is written in the HDD being a split source, and a key corresponding to thus written content is added in the encrypted content key table 101. Then, the content reconstruction information 117 of the moving information 103 between terminals 50 is set to a value indicating a position where writing is completed. The processing above is repeated until all the contents of a split target are moved. Upon completion of moving the split target contents, the moving information 103 is deleted and the processing is ended.

With the processing as described above, after the recording is completed and other contents are deleted or the like, whereby a free space of the HDD is secured, it is possible to combine the contents having been split at the time of recording, that is, the contents having been split between terminals connected via a network.

As thus described, according to the present embodiment, even when the content is split due to a failure occurrence while the content is moving, it is possible to properly continue moving the content, or to return the content to the source. Compared to the case where the content is left split, it is not necessary for a user to memorize a correspondence between the split contents, thereby significantly increasing the level of the user's convenience.

In addition, when recording of the content cannot be continuously performed due to a lack of space in the accumulation medium such as HDD, it is possible to split the content and record the split contents in media within the terminal or in the terminal connected via a network. Since the information indicating the correspondence between the split source content and the split target content is maintained, those split contents can be combined after a free space of the HDD is secured by deleting other unnecessary content or the like, thereby significantly increasing the level of the user's convenience.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A controller for moving a content stored in a first medium to a second medium, comprising:
   a playback impracticable unit for rendering the content remaining in the first medium to be playback impracticable, the content corresponding to the content having been moved to the second medium;
   a storage unit for storing management information regarding content movement, including information which identifies the second medium as a target and the content therein;
   a selection unit for selecting one of continuously moving and reconstructing the content in the first medium, when a failure occurs during movement of the content to the second medium;
   a verification unit for verifying the second medium and the content therein, by use of the management information; and
   a content reconstruction control unit for determining a range as to which one of continuing the content movement and reconstructing the content is performed, so as to continue one of the content movement and the content reconstruction,
   wherein the verification unit performs the verification before performing continuing the content movement and reconstructing the content whether or not the second medium is in agreement with the medium identified by the management information and the content is in agreement with content identified by the management information being managed before occurrence of the failure,
   wherein the content reconstruction control unit performs continuing the content movement and reconstructing the content in case the verification is successful, and stops continuing the content movement and reconstructing the content in case the verification fails.

2. The controller according to claim 1, further comprising:
   a media judgment unit for judging a type of medium on which the second medium is formed,
   wherein the content reconstruction control unit inhibits reconstruction of the content, when the media judgment unit judges that the type of medium is incapable of rendering the content to be playback impracticable.

3. The controller according to claim 1, further comprising:
   a display unit for displaying selectable processing according to the information regarding the content movement; and
   an input unit for allowing an input by operation of a user out of the selectable processing displayed by the display unit,
   wherein the selection unit performs processing in accordance with the input by the input unit.

4. A management system for moving content to store the content in a different medium, comprising:
   a first medium for storing the content therein;
   a second medium for storing a split content obtained by splitting the content, at the time when the content is stored in the first medium;
   a storage unit for storing management information regarding content movement, including at least information as to storing the split content in the second medium, information which identifies the second medium to store the split content, and information which identifies the split content;
   a verification unit for verifying the second medium and the split content, by use of the management information;
   a processing unit for combining the content corresponding to the split content stored in the first medium with the split content stored in the second medium; and
   a playback impracticable unit for rendering the split content stored in the second medium to be playback impracticable, when the combining of the split contents is completed with the processing unit,
   wherein the verification unit performs the verification before combining the content whether or not the second medium is in agreement with the medium identified by the management information and the split content is in agreement with a content identified by the management information,
   wherein the processing unit performs the combination of the split content in case the verification is successful, and stops the combination of the split content in case the verification fails.

5. The management system according to claim 4, wherein, when the storage capacity in the first medium is running low, the second medium stores the split content to be stored subsequently, the second medium being different from the first medium and being provided in the same device as the first medium.

6. The management system according to claim 4, wherein:
   when the storage capacity in the first medium is running low, the second medium stores the content to be stored subsequently, as a split content, the split content being transmitted via a network,
   the storage unit stores information indicating a status whether or not there exist contents split and stored in the second medium, information which identifies the second medium, and information which identifies the split content, and
   the processing unit reconstructs the split content received from the second medium via the network, and the content thus reconstructed is stored in the first medium.

7. A management method for moving a content among media, comprising:
   storing in a storage unit management information regarding content movement, the management information including information which identifies a second medium and the content therein as a target;
   moving the content, so as to read out the content stored in a first medium and to write the content into the second medium;
   checking whether or not there occurs an error in the course of moving the content;
   rendering the content existing in the first medium to be playback impracticable, the content corresponding to the content having been moved to the second medium if it is determined that there is no error occurrence;
   verifying the second medium and the content as a target, if it is determined that there is an error occurrence, by use of the management information identifying the second medium and the content;

grasping a position where the content movement to the second medium is completed, so as to be aware of the position of the content from which the movement is to be started continuously; and moving the content so as to read out the corresponding content stored in the first medium corresponding to the position, and to write the content into the second medium, wherein the verification step performs the verification before performing continuing the content movement and reconstructing the content whether or not the second medium is in agreement with the medium identified by the management information and the content is in agreement with a content identified by the management information being managed before occurrence of the failure, wherein continuing the content movement and reconstructing the content is performed in case the verification is successful and stops continuing the content movement and reconstructing the content in case the verification fails.

8. The management method according to claim 7, further comprising:

creating key information used for encrypting the content in the content movement and storing the key information in the storage unit as one piece of the management information, and writing the key information into the second medium, when the content movement to the second medium is completed.

9. The management method according to claim 7, wherein, when an error occurs in the course of the content movement, the method further comprises:

producing a display to select processing including at least continuation of the movement and reconstruction of the content in the first medium to allow a user to select the processing through an input device.

10. The management method according to claim 9, further comprising:

verifying the second medium as a target and the content, by use of the management information when the reconstruction of the content is selected;

grasping a position from which the playback of the content in the first medium is possible, and also grasping the position of the content from which the reconstruction is to be started; and performing content reconstruction processing which reads out the content stored in the second medium corresponding to the position, and writes the content into the first medium.

11. A management method for moving contents among media, comprising:

storing in a storage unit management information regarding content movement, the management information including information which identifies a second medium as a target and the content therein;

moving the content so as to read out the content stored in a first medium and to write the content into the second medium;

checking whether or not there occurs an error in the course of moving the content;

rendering the content existing in the first medium to be playback impracticable, the content corresponding to the content having been moved to the second medium if it is determined that there is no error occurrence;

verifying the second medium as a target and the content, if it is determined that an error occurred and the content movement is to be reconstructed, by use of the management information which identifies the second medium and the content;

grasping a position where the playback of the content is possible, so as to be aware of the position of the content from which the reconstruction is to be started; and performing processing to read out the content stored in the second medium corresponding to the position, and write the content into the first medium, wherein the verification step performs verification before performing continuing the content movement and reconstructing the content whether or not the second medium is in agreement with the medium identified by the management information and the content is in agreement with a content identified by the management information being managed before occurrence of the failure, wherein continuing the content movement and reconstructing the content is performed in case the verification is successful and stops continuing the content movement and reconstructing the content in case the verification fails.

12. A program to execute, on a CPU, a management method for moving contents among media, comprising:

storing in a storage unit management information regarding content movement, the management information including information which identifies a second medium as a target and the content therein;

moving the content so as to read out the content stored in a first medium and to write the content into the second medium;

checking whether or not there occurs an error in the course of moving the content;

rendering the content existing in the first medium to be playback impracticable, the content corresponding to the content having been moved to the second medium if it is determined that there is no error occurrence;

verifying the second medium as a target and the content, if it is determined that an error occurred, by use of the management information which identifies the second medium the content;

grasping a position where the content movement to the second medium is completed, so as to be aware of the position of the content from which the movement is to be started continuously; and moving the content so as to read out the corresponding content stored in the first medium corresponding to the position, and to write the content into the second medium, wherein the verification step performs the verification before performing continuing the content movement and reconstructing the content whether or not the second medium is in agreement with the medium identified by the management information and the content is in agreement with a content identified by the management information being managed before occurrence of the failure, wherein continuing the content movement and reconstructing the content is performed in case the verification is successful and stops continuing the content movement and reconstructing the content in case the verification fails.

13. A program to execute, on a CPU, a management method for moving contents among media, comprising:

storing in a storage unit management information regarding content movement, the management information including information which identifies a second medium as a target and the content therein;

moving the content so as to read out the content stored in a first medium and to write the content into the second medium;

checking whether or not there occurs an error in the course of moving the content;

rendering the content existing in the first medium to be playback impracticable, the content corresponding to the content having been moved to the second medium if it is determined that there is no error occurrence;

verifying the second medium as a target and the content, if it is determined that an error occurred, by use of the management information identifying the second medium and the content;

grasping a position where the content movement to the second medium is completed, so as to be aware of the position of the content from which the movement is to be started continuously; and moving the content so as to read out the corresponding content stored in the first medium corresponding to the position, and to write the content into the second medium, wherein the verification step performs verification before performing continuing the content movement and reconstructing the content whether or not the second medium is in agreement with the medium identified by the management information and the content is in agreement with a content identified by the management information being managed before occurrence of the failure, wherein continuing the content movement and reconstructing the content is performed in case the verification is successful and stops continuing the content movement and reconstructing the content in case the verification fails.

14. The controller according to claim 1, wherein
the selection unit includes a display unit for displaying a list about information of the content being movable stored in the first medium and information of the second medium as the target; and
an input device for selecting the content and the second medium displayed on the display by operation of a user.

15. The controller according to claim 1, wherein the second medium is a removable medium.

16. The controller according to claim 1, wherein the management information is created every time the content is moved and the management information further includes information of a moving status indicating a status of movement of the content, a moving position indicating to what extent the movement of the content has progressed and content reconstruction information to be required to reconstruct the content.

17. The controller according to claim 16, wherein the moving position is a size of data having moved if a file size of the content is the same on the first medium and the second medium, and is a time of the content if the file size of the content in the second medium is changed from that of the first medium.

18. The management method according to claim 7, further comprising:
displaying on a display a list about information of the content being movable stored in the first medium and information of the second medium as the target after checking occurrence of the error; and
allowing a user through an input device to select the content and the second medium displayed on the display.

19. The management method according to claim 7, further comprising:
creating the management information every time the content is moved, the management information further including information of a moving status indicating a status of movement of the content, a moving position indicating to what extent the movement of the content has progressed and content reconstruction information to be required to reconstruct the content.

20. The controller according to claim 19, wherein the moving position may be a size of data having moved if a file size of the content is the same on the first medium and the second medium and may be a time of the content if the file size of the content in the second medium is changed from that of the first medium.

* * * * *